United States Patent [19]

Hartman

[11] Patent Number: 4,825,906
[45] Date of Patent: May 2, 1989

[54] ANGLE PATTERN CONTROL VALVE

[76] Inventor: Thomas A. Hartman, 700 Capac Ct., St. Louis, Mo. 63125

[21] Appl. No.: 203,253

[22] Filed: Jun. 6, 1988

[51] Int. Cl.$^4$ .................... F16K 47/04; F16K 47/14
[52] U.S. Cl. .......................... 137/625.3; 137/561 A
[58] Field of Search ..................... 137/625.3, 561 A

[56] References Cited

U.S. PATENT DOCUMENTS

| | | | |
|---|---|---|---|
| 3,794,056 | 2/1974 | Warren | 137/561 A |
| 4,041,982 | 8/1977 | Lindner | 137/625.3 |
| 4,149,563 | 4/1979 | Seger | 137/625.3 |
| 4,384,592 | 5/1983 | Ng | 137/625.3 X |
| 4,397,331 | 8/1983 | Medlar | 137/625.3 X |
| 4,609,009 | 9/1986 | Tisone | 137/561 A |

Primary Examiner—John Rivell
Attorney, Agent, or Firm—Rogers, Howell, Moore & Haferkamp

[57] ABSTRACT

A control valve of the angle pattern type has a valve body with first and second valve members supported by the valve body such that one of the members is adjustably movable relative to the other. The control valve has a fluid inlet, a fluid outlet, and a fluid passage from the inlet to the outlet for the flow of fluid therethrough. The valve body has a hollow portion in the fluid passage defining a cylindrical section, and the valve members define a control orifice therebetween within the passage for the flow of fluid therethrough, the flow of fluid being generally radially through the orifice. An inlet chamber is located in the passage at the entrance of the control orifice. The passage and control orifice direct the fluid flow such that the fluid turns 90° as it flows from the chamber into the control orifice and turns 90° as it flows from the control orifice. The cross section of the chamber taken perpendicular to the longitudinal axis of the cylindrical section of the valve body is generally an eccentric annulus. One of the valve members is adjustable axially relative to the other to vary the size of the control orifice.

41 Claims, 4 Drawing Sheets

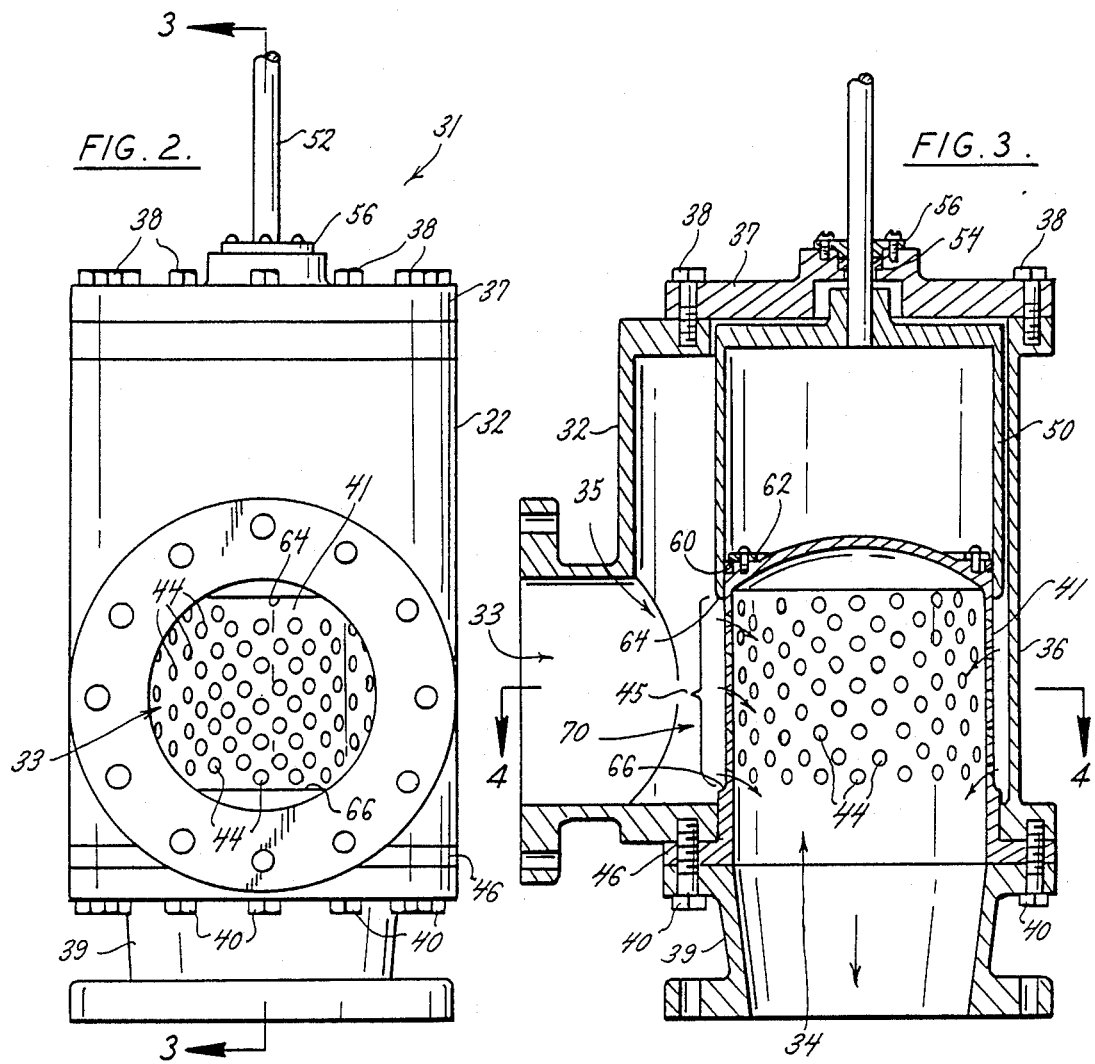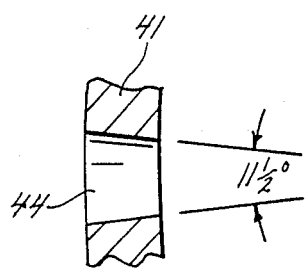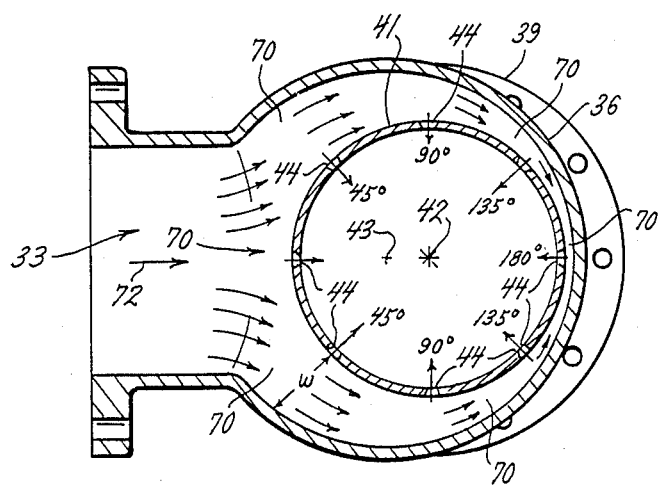

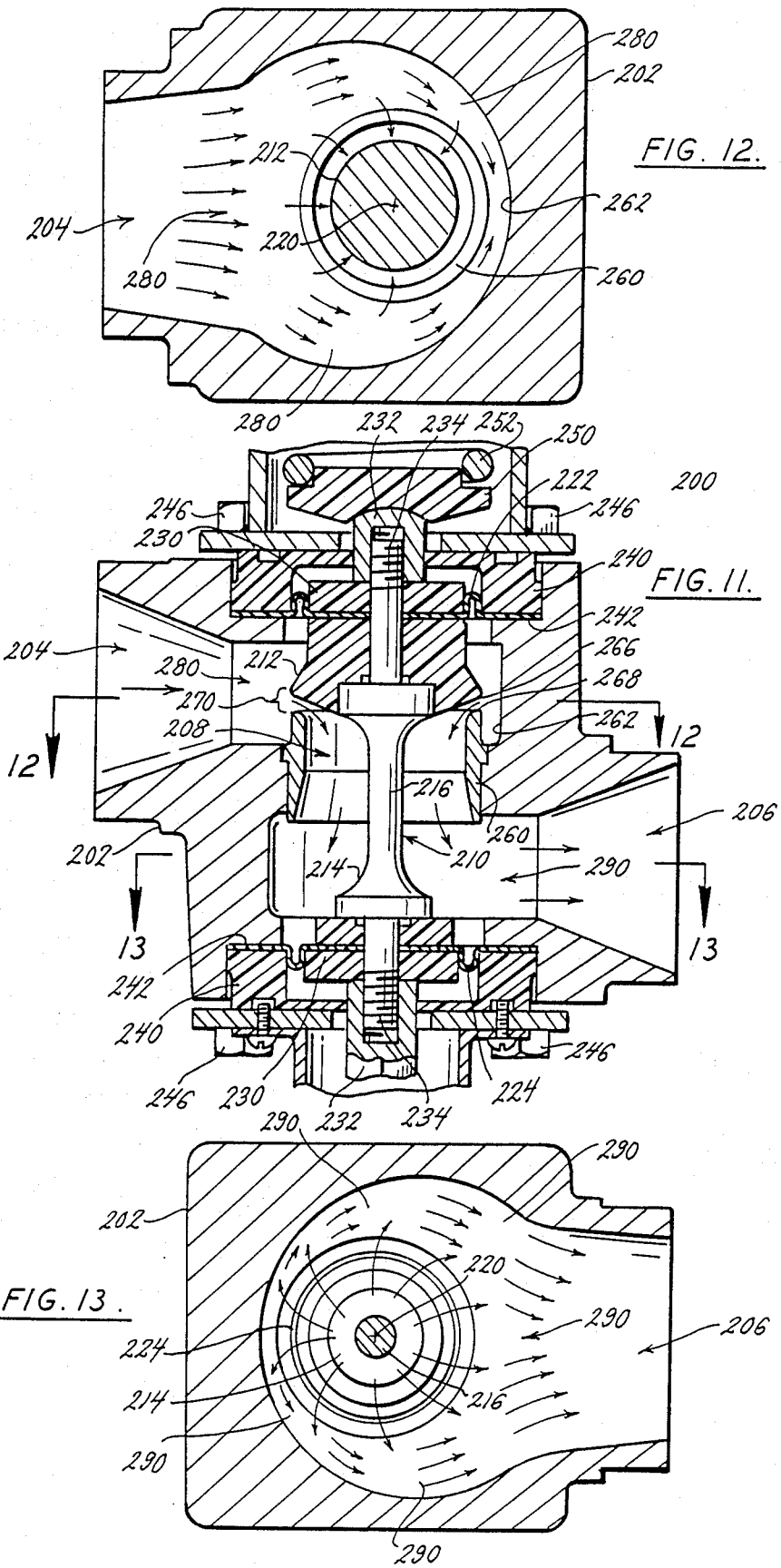

ANGLE PATTERN CONTROL VALVE

BACKGROUND AND SUMMARY OF THE INVENTION

This invention is directed to a control valve and more particularly to such a valve for maintaining a constant peripheral velocity and constant velocity head before and after the intended control point of the valve, and is particularly directed to "angle pattern" control valves where the direction of fluid flow entering the inlet chamber is at 90° to the direction of fluid flow directly from the control orifice. Therefore, the valve of the present invention does not include what are commonly referred to as butterfly, ball, plug, gate, or needle valves. It does include angle pattern valves utilizing a sleeve with multiple nozzles, or a single annular control orifice whose peripheral length is small compared to its peripheral circumference. Valves utilizing the present invention may range in size from quite small (about one inch in diameter) to quite large (96 inches in diameter).

One of the problems associated with known valves of the general type to which the present invention relates, including valves commonly referred to as sleeve valves or multi jet sleeve valves as exemplified in U.S. Pat. No. 2,596,534, is that they must be operated with back pressure to prevent excessive vibration. When operated under high flow rates without back pressure on the valves, such as under free discharge conditions, the valves vibrate. Such vibration causes excess wear and noise. To reduce the vibration problem, it was required that the valves be operated with back pressure or a limiting velocity in the case of the angle pattern valve. In some cases, an adjustable mechanical stop was used to limit the opening stroke of the valve to reduce vibration. Therefore, with either of these solutions while vibration was reduced or eliminated, the valve's capacity was also reduced.

In accordance with the present invention, such vibration is eliminated without significantly reducing the flow capacity of the valve. The valve of the present invention need not be operated with back pressure or with mechanical stops that limit the opening of the valve reducing the valve's capacity.

Generally, the control valve of the present invention includes a valve body with first and second valve members supported by the valve body. The valve has a fluid inlet, a fluid outlet, and a fluid passage from the inlet to the outlet. The valve body has a hollow portion in the fluid passage that defines a cylindrical section. At least one of the valve members is movable relative to the other, with a control orifice defined between the two members such that the fluid flows through the orifice. The size of the orifice is changed by a movement of one of the valve members to control the amount of fluid that flows through the valve, and to open and close the valve. An inlet chamber is located in the passage at the entrance of the control orifice. The passage and control orifice direct the flow of fluid such that the fluid turns 90° as it flows from the chamber into the control orifice. Moreover, the direction of fluid flow as the fluid enters the chambers is at 90° to the longitudinal axis of the cylindrical section of the valve body with the fluid flowing radially inwardly through the control orifice. The cross section of the chamber taken perpendicular to the longitudinal axis of the cylindrical section of the valve body is generally an annulus, and it is of particular importance that in accordance with the invention the chamber is shaped such that the velocity of the fluid through the chamber is generally constant.

To achieve this generally constant velocity through the chamber, the cross sectional area of the chamber taken perpendicular to the direction of fluid flow within the chamber, before the fluid turns into the control orifice, diminishes in the direction of fluid flow through the chamber. In other words, the chamber becomes progressively smaller in cross section taken perpendicular to the direction of fluid flow within the chamber, the chamber becoming progressively smaller as the fluid moves through the chamber. In the valve of the present invention, this is accomplished by offsetting the control orifice from the longitudinal axis of the cylindrical section such that the annular chamber is eccentric.

The result is a control valve that maintains generally constant velocity through the chamber, does not have significant velocity head loss, will operate at very high velocities and under free discharge or negative outlet head pressure conditions, is without significant vibration, and operates at very low noise levels.

These and other objectives and advantages of the present invention are apparent from the detailed description to follow.

DESCRIPTION OF THE DRAWING

FIG. 2 is a side elevation view of an angle pattern control valve of the present invention;

FIG. 3 is a view in section taken generally along the line 3—3 of FIG. 2;

FIG. 4 is a view in section taken generally along the line 4—4 of FIG. 3;

FIG. 5 is a view in section showing a nozzle;

FIG. 11 is a longitudinal section showing another embodiment of an angle pattern control valve of the present invention;

FIG. 12 is a view in section taken generally along the line 12—12 of FIG. 11; and FIG. 13 is a view in section taken generally along the line 13—13 of FIG. 11.

DETAILED DESCRIPTION OF PREFERRED EMBODIMENTS

Figure 1:
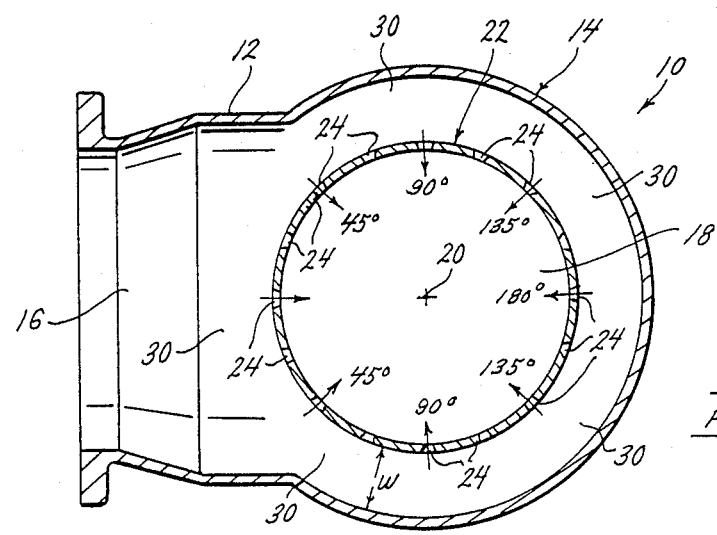
FIG. 1 is a cross sectional view of a prior art angle pattern sleeve valve.

Preferred embodiments of the present invention will be described with reference to FIGS. 2 through 13. FIG. 1 shows a prior art angle pattern sleeve valve with the problems and disadvantages referred to above. By "angle pattern" sleeve valve is meant a sleeve valve where the direction of fluid flow into the chamber is at 90° to the direction of fluid flow from the control orifice, with the fluid flowing radially inwardly through the control orifice and then turning 90° from the control orifice. That the fluid may actually exit the valve at some other direction is of no consequence. FIG. 1 depicts such an angle pattern sleeve valve 10 having a valve body 12 with a hollow cylindrical section 14. The valve has an inlet 16 and an outlet 18 that may be along the longitudinal axis 20 of the cylindrical section 14. The valve has a first member 22 which is a cylindrical sleeve having radially directed openings or nozzles 24 extending substantially all around the sleeve and along an axial distance or length. The nozzles are uniformly sized and spaced 360° around the sleeve and over the orifice length. It is to be understood that the valve 10 also has a second valve member (not shown) concentric with the sleeve, and that one of the valve members moves relative to the other to change the number of nozzles 24 that are in the flow path of the fluid. Hence, the nozzles 24 located in the flow path define a control orifice through which the fluid flows, and this control orifice can be varied in size by moving the movable member so as to control the amount of fluid flowing through the valve, and to open and close the valve.

At the entrance of the control orifice or nozzles is a chamber 30 that surrounds the control orifice into which the fluid flows before passing through the orifice or nozzles. FIG. 1 is a cross section taken through the chamber perpendicular to the longitudinal axis of the cylindrical section and sleeve. It will be noted that the cylindrical section 14 and sleeve 22 are concentric so that the shape of the chamber 30 between the cylindrical section 14 and the sleeve 22 is generally a concentric annulus.

The velocity of the fluid through each nozzle will be the same only if the velocity of the fluid in the chamber 30 as it approaches each nozzle is constant. Such is not the case with the prior art valve of FIG. 1. Instead, because of the concentric annulus shape of the chamber 30, the velocity of the fluid through the nozzles progressively decreases in the direction of fluid flow through the chamber. That is, the velocity of fluid through the nozzles at 45° is greater than the velocity through the nozzles at 90° which are greater than the velocity through the nozzles at 135°, and so on. To further illustrate, 50% of the fluid flow must pass the 90° locations of the sleeve. This 50% flow (25% at each side) divided by the length of the orifice or nozzle area (taken parallel to the axis 20) multiplied by the width w at 90° is representative of a certain velocity of fluid flow at the 90° locations. Because 25% of the total flow (12½% at each side) must pass the 135° locations, it is apparent that if the length of the orifice area and the width w at 135° is the same as at 90°, the velocity of fluid flow at 135° will be one-half of the velocity of fluid flow at 90°. At 180°, with the same length and width w, the velocity of fluid flow will approach zero. These are the conditions that exist with the prior art valve of FIG. 1.

To further illustrate, the definition of "velocity head" is $V^2$ divided by $2G$, where V is velocity in feet per second, and G is 32.17. By way of example, if the inlet area at the entrance 16 of the valve is 1,000 square inches with a fluid velocity at the inlet of 30 feet per second, and the length of the orifice area times the width w at each of the two 90° locations (through which 50% of the fluid must flow) is 500 square inches, then the velocity of fluid flow at each of the 90° locations is also 30 feet per second. However, because the area at each of the 135° locations is the same as at 90°, the velocity of fluid flow at each of the 135° locations is 15 feet per second in as much as the volume of fluid flow at a 135° location is one-half the volume at a 90° location. Under these conditions the "velocity head loss" between 90° and 135° is 10.5 feet of head or 4.5 psi. When this velocity head loss in the chamber before entering the control orifice exceeds the loss through the control orifice, the control shifts erratically from the control orifice to a location just upstream of the control orifice, producing noise and vibration. To adequately reduce the noise and vibration with the prior art valve of FIG. 1, the valve must be operated with a substantial back pressure, at least about 10 feet, at the outlet to preclude this control shift.

The present invention overcomes this problem of control shift accompanied by noise and vibration by maintaining a substantially constant velocity of fluid flow through the chamber. This is accomplished by providing that the cross sectional areas of the chamber taken generally perpendicular to the direction of fluid flow within the chamber, before the fluid turns into the control orifice, diminish in the direction of fluid flow through the chamber. This is further accomplished by providing an eccentric inlet chamber. These characteristics which achieve these beneficial results are illustrated by the preferred embodiments which will now be described with reference to the drawing.

With reference to FIGS. 2 through 5 of the drawing, there is shown a control valve 31 of the present invention which is of a type known as a angle pattern sleeve valve with the inlet to the chamber at 90° to the longitudinal axis of the sleeve as will be described. The valve includes a valve body 32 having an inlet 33, an outlet 34, and a passage generally shown at 35 for the flow of fluid, such as water, from the inlet to the outlet. The valve body has a hollow generally cylindrical section 36 directly adjacent the inlet 33 such that the portion of the passage from the inlet communicates directly with the hollow cylindrical section 36. In describing the section 36 as generally cylindrical, it is to be understood that the section is not a true cylinder in that the wall of the cylinder is interrupted by the inlet 33. Nevertheless, a substantial portion of the section 36 is cylindrical.

One end of the valve has a cover 37 secured to the end of the valve body such as by bolts 38. Another end of the valve has a flanged adapter 39 secured to the valve body at the outlet 34 such as by bolts 40.

A sleeve 41 is located within the cylindrical section 36 and has a longitudinal axis 42 that is parallel to the longitudinal axis 43 of the cylindrical section 36. The wall of the sleeve 41 has openings 44 therethrough. The openings 44 are preferably of equal size and are uniformly spaced 360° around the sleeve, and over a length of the sleeve as generally shown at 45. The openings 44 define nozzles through which the fluid flows radially inwardly as will be further explained. The axis of each nozzle is directed radially, and preferably each nozzle is tapered as shown in FIG. 5 with the nozzle becoming smaller from outside in. Preferably, the taper is between about 11° and 12° with 11¼° being the most preferred. For example, a angle patter sleeve valve of the type shown with a 12 inch diameter inlet might have 600 nozzles each with a nominal diameter of one-half inch and spaced seven-eigths inch apart. The sleeve 41 has a flange 46 for securing the sleeve to the valve body such as with the bolts 40. Hence, in this preferred embodiment, the sleeve 41 is an immovable member relative to the valve body.

A cylindrical sleeve gate 50 closely surrounds the sleeve 41 and is concentric with the sleeve 41. A shaft 52 extends from one end of the sleeve gate 50 through suitable packing 54 secured by a packing retainer 56 mounted to the cover. By an appropriate actuator (not shown) the shaft 52 may be moved axially to move the sleeve gate axially relative to the sleeve 41 to close off or expose some or all of the nozzles 44. To seal the sleeve gate 50 with respect to the sleeve 41, there is a ring seal 60 secured in sealing engagement by a seal retainer 62 secured to one end of the sleeve 41. The end of the sleeve gate opposite the end where the shaft is mounted has a gate seat 64 that seats with a sleeve seat 66 when the valve is closed.

In this preferred embodiment the sleeve gate 50 is movable axially relative to the sleeve 41, and defines with the sleeve 41 a control orifice The control orifice is that portion of the sleeve 41 with exposed nozzles 44. Hence, the control orifice may be thought of as an annular opening where the length of the opening is equal to the length of the sleeve that is exposed to the flow path. This length is adjustable by adjusting the sleeve gate 50. In other words, by adjusting the sleeve gate 50 the size of the control orifice may be adjusted The valve is shown in the fully open position in FIG. 3. In the fully closed position, the sleeve gate is moved axially to completely surround the sleeve with the gate seat 64 engaging the sleeve seat 66. The valve may be opened to any position therebetween.

In accordance with the invention, the sleeve 41 is eccentric with respect to the cylindrical section 36 as best shown in FIG. 4. Hence, the longitudinal axis 42 of the sleeve is parallel to but offset from the longitudinal axis 43 of the cylindrical section 36. Hence, between the cylindrical section 36 and the sleeve 41 there is defined a chamber 70. The fluid flows into the chamber 70 just prior to entering the control orifice. Because of the eccentricity of the sleeve relative to the cylindrical section, the shape of the chamber 70 in cross section taken perpendicular to the longitudinal axes 42 and 43 is generally an eccentric annulus as shown in FIG. 4. The eccentric offset of the sleeve relative to the cylindrical section is in the direction of the arrow 72 which is the direction of fluid flow as the fluid enters the chamber 70. In this way half of the fluid entering the chamber flows in one direction (clockwise) around the sleeve, and one-half of the fluid flows in the other direction (counterclockwise) around the sleeve as depicted by the arrows in FIG. 4.

As the fluid flows around the sleeve, the cross sectional area of the chamber taken perpendicular to the direction of fluid flow within the chamber as shown by the arrows, before the fluid turns into the control orifice or nozzles, diminishes. In other words, the chamber becomes narrower. However, the quantity of fluid also diminishes as the fluid in the chamber is continually flowing from the chamber through the control orifice as it also flows around the sleeve. The amount of eccentricity should be such that the reduction in the size of the flow path within the chamber as the fluid flows therethrough approximately compensates for the reduction in the amount of fluid as it flows through the chamber to maintain approximately constant velocity of the fluid as it flows through the chamber. With the orifices directly in line with the fluid flow as it enters the chamber taken as zero degrees, and with 50% of the fluid passing the 90° locations and 25% of the fluid passing the 135° locations, the width w, which is the radial width between the cylindrical section 36 and the sleeve 41, at the 135° locations should be approximately one-half the width w at the 90° locations. Also, the width w at the 45° locations should be approximately 1½ times the width w at the 90° locations. These conditions will produce a generally constant velocity of the fluid through the chamber.

The fluid enters the inlet 33 and flows directly toward the chamber 70 whereupon half of the fluid travels around the sleeve in one direction and the other half of the fluid travels around the sleeve in the opposite direction. The fluid flow within the chamber is in the direction of the arrows. From the chamber, the fluid turns 90° through the control orifice or exposed nozzles 44 to flow radially inwardly, whereupon the fluid makes another 90° turn within the sleeve toward the outlet 34. Because the fluid flow through the chamber 70 and nozzles 44 is of generally constant velocity, the core of the flow within the sleeve is located approximately at the center of the sleeve.

Figure 6:
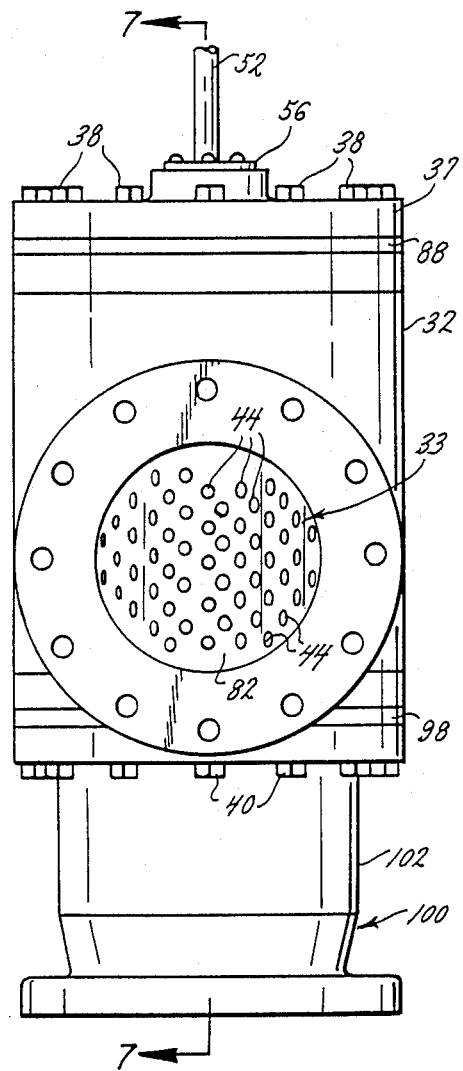
FIG. 6 is a side elevational view of another embodiment of an angle pattern control valve of the present invention.
Figure 7:
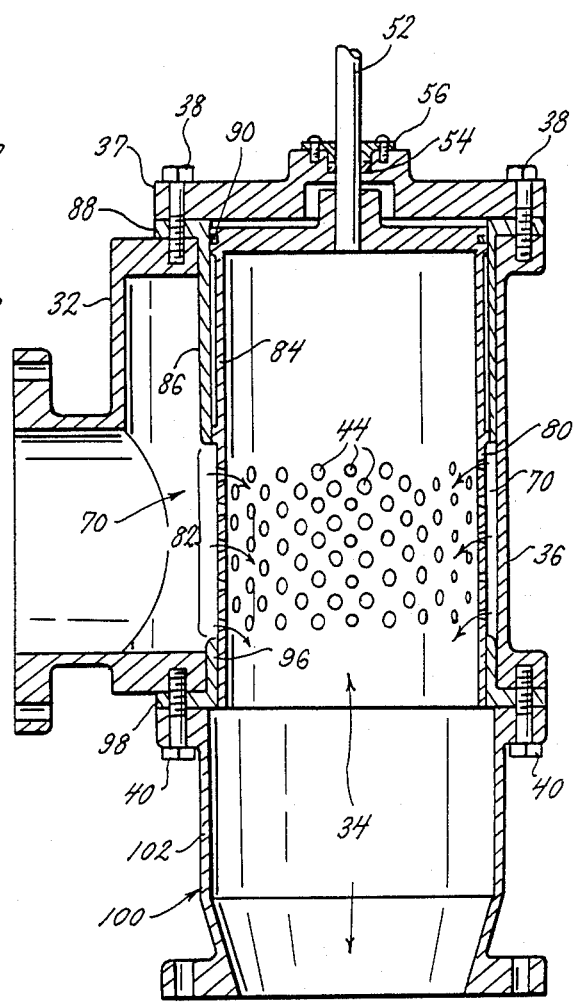
FIG. 7 is a view in section taken generally along the line 7—7 of FIG. 6.

With reference to FIGS. 6 and 7, there is shown another preferred embodiment of the invention that is similar to the embodiment of FIGS. 2 through 5 except that the orifice or nozzle sleeve is axially movable rather than stationary relative to the valve body as with the first described embodiment. Only the differences between this embodiment and the one of FIGS. 2 through 5 will be described.

With this embodiment, the sleeve 80 is longer than the sleeve 41 of the first embodiment. The sleeve 80 has an orifice or nozzle sleeve section shown generally at 82, and a closed sleeve section 84 without nozzles. The shaft 52 is secured to one end of the sleeve 80 for movement of the sleeve along its longitudinal axis. A cylindrical sleeve guide 86 surrounds the closed section 84 of the sleeve with the valve fully open. The guide 86 has an annular flange 88 by which it is mounted to the valve body 32 by the bolts 38. The sleeve 80 has a ring seal 90 for sliding sealing engagement with the interior surface of the guide 86.

An annular sleeve gate 96 has an annular flange 98 by which it is mounted to the valve body by the bolts 40. The sleeve gate 96 closely surrounds the sleeve 80 and is stationary relative to the valve body such that the sleeve moves axially relative to the sleeve gate.

As with the first described embodiment, the control orifice is defined by the sleeve section 82 and sleeve gate 96 and is represented by the nozzles 44 that are exposed to the flow path depending on the degree to which the valve is open. In this embodiment, a flange adapter 100 at the outlet of the valve has a cylindrical section 102 into which the sleeve 80 extends as the valve is closed.

The cross section through the chamber area taken perpendicular to the longitudinal axes of the sleeve and cylindrical section is the same as with the first described embodiment as shown in FIG. 4. The eccentricity, principle of operation, and other features described in connection with the first embodiment also apply to this embodiment.

Figure 8:
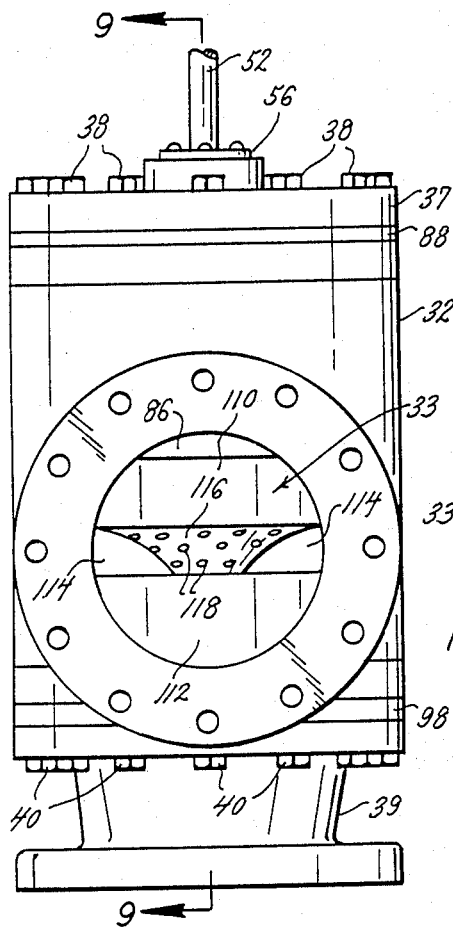
FIG. 8 is a side elevational view of another embodiment of an angle pattern control valve of the present invention.
Figure 9:
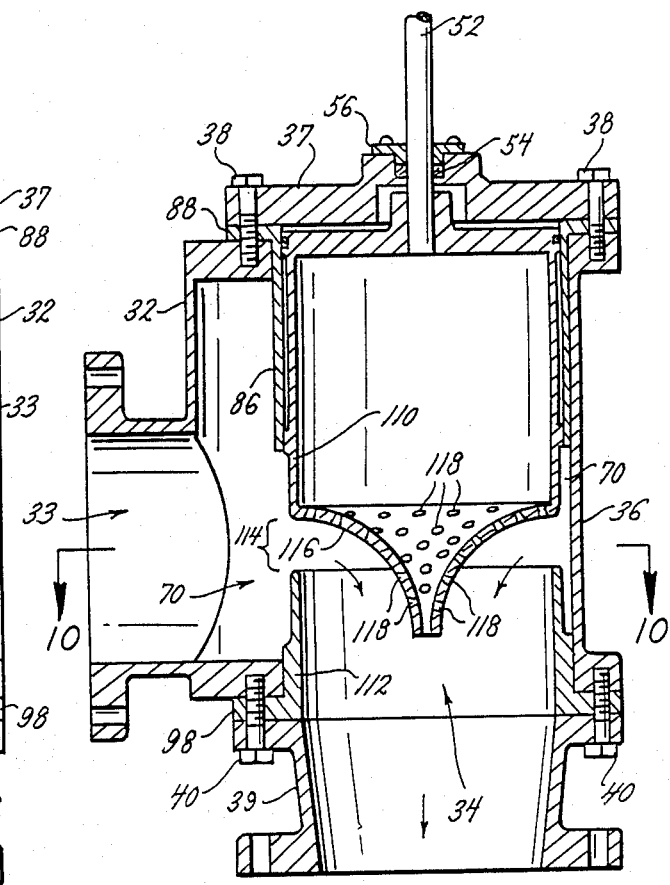
FIG. 9 is a view in section taken generally along the line 9—9 of FIG. 8.
Figure 10:
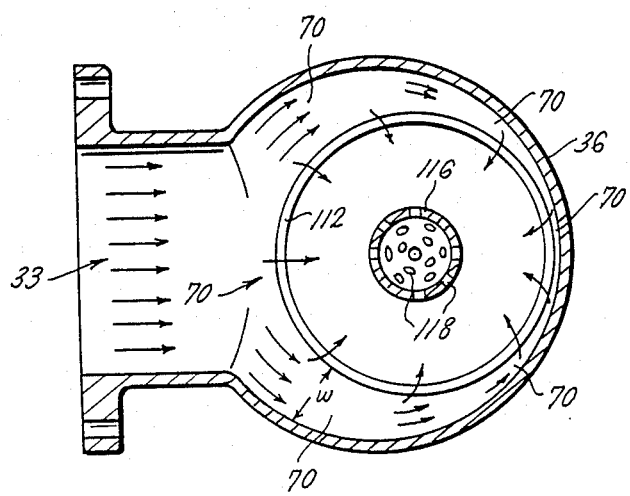
FIG. 10 is a view in section taken generally along the line 10—10 of FIG. 9.

FIGS. 8 through 10 show another embodiment of the invention that has the same principle of operation and many of the same structural features as the first two embodiments. It differs from the embodiment of FIGS. 6 and 7 primarily in the structure of the sleeve and the shape of the control orifice.

As with the embodiment of FIGS. 6 and 7, a sleeve 110 moves axially within the sleeve guide 86 for opening and closing the valve. The sleeve also defines with a sleeve gate 112 (similar to the sleeve gate 96) an annular control orifice shown generally at 114. The sleeve 110 differs from the sleeve 80 in that it does not have a nozzle section. Instead, the control orifice 114 is defined by the opening between the end of the sleeve 110 and the end of the sleeve gate 112.

The end of the sleeve 110 adjacent the control orifice has a concave conical flow director section 116. The flow director has openings 118 over substantially its entire surface to equalize the pressure on both sides of the sleeve. Otherwise a pressure differential would make it more difficult to open the valve.

The fluid flow is similar to that of the embodiments previously described. Fluid from the inlet is directed into the chamber 70 and flows in opposite directions around the sleeve 110 and sleeve gate 112 at the location of the control orifice 114 as shown by the arrows of FIG. 10. From the chamber, the fluid turns 90° through the control orifice 114 in a radially inward direction whereupon it is deflected by the flow director 116 making another 90° turn toward the outlet 34. The functional and operational characteristics of the valve of this embodiment are the same as with the previously described embodiments to provide a generally constant velocity of fluid flow through the chamber.

While the flow director 116 is provided with this embodiment, the flow director may be eliminated such that the end of the sleeve 110 adjacent the control orifice is generally squared off. The flow director helps to smooth the flow path for the fluid as it turns 90° from the control orifice toward the outlet.

The valve is shown in the fully open position in FIG. 9. The degree to which the valve is open is determined by the length of the control orifice 114 which is adjusted by axial movement of the sleeve 110. The maximum length of the control orifice, with the valve in the fully open position, should be no more than about 5% of the circumference of the control orifice so that the valve will have the functional and operational characteristics previously described.

In FIGS. 11 through 13 there is shown another embodiment of the invention which differs in some ways structurally from those previously described but uses the same functional and operational principles to maintain approximately constant velocity of fluid flow through the inlet chamber.

Control valve 200 has a valve body 202 with an inlet 204, an outlet 206, and a fluid passage generally shown at 208 between the inlet and the outlet for the flow of fluid therethrough. In this embodiment the flow paths of the fluid at the inlet and outlet are parallel but offset, that is, not along the same axis.

A valve stem 210 is located in the flow path within the valve body and has a disk portion 212 and a flow director portion 214 separated by a central shaft portion 216. The valve stem is symmetrical about its longitudinal axis 220. The valve stem is mounted within the valve body by diaphragms 222 and 224 located at opposite ends of the stem. The diaphragms allow the valve stem to move axially within limits to open and close the valve.

The diaphragm 222 is secured to the valve stem by means of a diaphragm retainer disk 230 and a hex nut 232 at the end of a threaded stud 234 such that the diaphragm 222 is held tightly between the end of the stem and the retainer 230. The diaphragm 222 is secured to the valve body by means of another diaphragm retainer 240. The diaphragm 222 is held tightly between the retainer 240 and an annular shoulder 242 of the valve body by means of a retainer plate 244 which is secured against the retainer 240 by bolts 246 that extend through the plate and into the valve body. The diaphragm 224 at the opposite end of the stem is similarly mounted as with the diaphragm 222.

A spring support 250 is located at one end of the valve stem against the end of the hex nut 232, and a coil spring 252 (partially shown) is seated against the spring support to urge the valve stem axially in one direction to a closed position.

An annular valve seat 260 is positioned within the flow path and secured to the valve body. The valve body has a hollow generally cylindrical section 262 in the flow path. The disk portion 212 of the valve stem is located within the cylindrical section. The disk portion 212 and seat 260 have mating seating surfaces 266 and 268 located within the cylindrical section such that the disk and seat define a control orifice therebetween as shown generally at 270. The control orifice 270, like the control orifice 114 of the embodiment of FIG. 9, is annular, and the length of the orifice is adjustable with axial movement of the valve stem. As with the embodiment of FIG. 9, the maximum length of the control orifice 270 with the valve in the fully open position should be no more than approximately 5% of the circumference of the control orifice.

An inlet chamber 280 is defined between the cylindrical section 262 and the disk portion 212 and seat 260. The cross section of the chamber taken perpendicular to the longitudinal axes of the stem and cylindrical section of the valve body is generally an eccentric annulus as shown in FIG. 12. The chamber 280 communicates directly with the control orifice 270 and has essentially the same shape and functional characteristics as the inlet chambers of the previously described embodiments so that the velocity of fluid flow through the chamber remains generally constant as the fluid flows therethrough.

In addition to the inlet chamber 280, the control valve of this embodiment has an outlet chamber 290 in direct communication with the flow of fluid from the control orifices and with the outlet. The cross section of the chamber 290 taken perpendicular to the longitudinal axis of the stem is also generally an eccentric annulus as shown in FIG. 13 such that the velocity of fluid flow through the chamber 290 is generally constant. The surface of the flow director portion 214 of the stem is generally that of a concave conical shape to smooth the fluid flow.

As can be seen by the arrows, fluid enters the inlet chamber 280 and flows in opposite directions through the chamber around the disk portion 212 and seat 260 whereupon it turns 90° radially inwardly through the control orifice 270. From the control orifice, the fluid again turns 90° to flow in the axial direction along the stem 210. At the other end of the stem the fluid makes another 90° turn assisted by the director portion 214 and is directed generally radially outwardly from the stem into the chamber 290 whereupon it flows at a generally constant velocity toward the outlet.

The direction of fluid flow at the inlet is shown to be opposite to the direction of fluid flow at the outlet, that is, they are 180° apart about the longitudinal axis of the stem. It is to be understood that the direction of fluid flow at the inlet and outlet may have any angular relationship with respect to each other although with this embodiment the direction of fluid flow as the fluid enters the inlet chamber 280 and the direction of fluid flow as the fluid leaves the outlet chamber 290 should each be at 90° to the longitudinal axis of the stem.

I claim:

1. A control valve comprising:
   (a) a valve body;
   (b) a first valve member supported by the valve body;
   (c) a second valve member supported by the valve body, at least one of the valve members being adjustably movable relative to the other;
   (d) said control valve having a fluid inlet, a fluid outlet, and a fluid passage from the inlet to the outlet for the flow of fluid therethrough;
   (e) said valve body having a hollow portion in the fluid passage defining a cylindrical section;
   (f) the valve members defining a control orifice means therebetween within said passage for the flow of the fluid therethrough;
   (g) an inlet chamber in the passage at the entrance of the orifice means, the direction of fluid flow as the fluid enters the inlet chamber being at 90° to the longitudinal axis of the cylindrical section;
   (h) the passage and orifice means directing the fluid flow such that the fluid turns 90° as it flows from the chamber into the orifice means where it flow radially and then turns 90° as it flows from the orifice means;
   (i) the cross section of the chamber taken perpendicular to the longitudinal axis of the cylindrical section of the valve body being generally an annulus; and
   (j) the cross sectional area of the chamber taken perpendicular to the direction of fluid flow within the chamber, before the fluid turns into the orifice means, diminishing in the direction of fluid flow through the chamber.

2. The control valve of claim 1 wherein the chamber is shaped such that the velocity of the fluid through the chamber is generally constant.

3. The control valve of claim 1 wherein the cross-sectional areas of the chamber taken perpendicular to the direction of fluid flow within the chamber at locations where one-half of the fluid passes, are about twice the cross-sectional areas of the chamber taken perpendicular to the direction of fluid flow within the chamber at locations where one-fourth of the fluid passes.

4. The control valve of claim 3 wherein the cross-sectional areas of the chamber taken perpendicular to the direction of fluid flow within the chamber at locations where three-fourths of the fluid passes, are about one and one-half times the cross sectional areas of the chamber taken perpendicular to the direction of fluid flow within the chamber at locations where one-half of the fluid passes.

5. The control valve of claim 1 wherein the shape of said cross-section of the chamber taken perpendicular to the longitudinal axis of the cylindrical section of the valve body is an eccentric annulus.

6. The control valve of claim 1 further comprising a sleeve with openings in the sleeve side wall extending substantially all around said wall at the location of the chamber to define said control orifice means.

7. The control valve of claim 1 wherein said first valve member has a side wall portion which is generally circular in cross-section at the location of the chamber and which defines, with the second valve member, said control orifice means, said first valve member being adjustable axially relative to the second valve member to vary the size of the control orifice means to open and close the valve.

8. The control valve of claim 6 wherein said sleeve is adjustably movable.

9. The control valve of claim 6 wherein the sleeve is stationary relative to the valve body.

10. The control valve of claim 7 wherein the longitudinal axis of the sleeve portion is parallel to but offset from the longtitudinal axis of the cylindrical section in a direction directly away from the flow of fluid as it enters the inlet chamber, whereby one-half of the fluid entering the chamber flows in one direction about the sleeve portion, and the other half flows in the opposite direction about the sleeve portion.

11. A control valve comprising:
    (a) a valve body;
    (b) a first valve member supported by the valve body;
    (c) a second valve member supported by the valve body, one of the valve members being adjustably movable relative to the other valve member;
    (d) said control valve having a fluid inlet, a fluid outlet, and a fluid passage from the inlet to the outlet for the flow of fluid therethrough;
    (e) said valve body having a hollow portion in the fluid passage defining a cylindrical section;
    (f) one of said valve members having a cylindrical sleeve portion with openings therethrough extending all around said sleeve defining a control orifice means for the flow of fluid therethrough;
    (g) an inlet chamber in the passage at the entrance of the orifice means;
    (h) the passage and orifice means directing the fluid flow such that the fluid turns 90° as it flows from the chamber into the sleeve openings where it flows radially and then turns 90° as it flows from the sleeve openings;
    (i) the cross section of the chamber taken perpendicular to the longitudinal axis of the cylindrical sleeve portion being generally an eccentric annulus.

12. The Control valve of claim 11 wherein said sleeve portion remains stationary relative to the valve body.

13. The control valve of claim 11 wherein said sleeve portion moves axially to open and close the valve.

14. The control valve of claim 11 further comprising a sleeve gate concentric with and in sealing engagement with said sleeve portion, at least one of said sleeves movable axially with respect to the other to change the size of the control orifice means by changing the number of sleeve portion openings exposed within the passage.

15. The control valve of claim 14 wherein the sleeve portion is movable axially to open and close the valve.

16. The control valve of claim 14 wherein the sleeve gate is movable axially to open and close the valve.

17. The control valve of claim 16 further comprising a valve seat engaged by the sleeve gate in the closed position.

18. The control valve of claim 11 wherein the fluid flow at the inlet is at 90° to the fluid flow at the outlet.

19. The control valve of claim 11 wherein the fluid flow at the inlet and the fluid flow at the outlet are along parallel paths.

20. The control valve of claim 11 wherein the sleeve openings are directed radially through the side wall of the sleeve portion and are tapered so as to narrow in the direction of fluid flow.

21. The control valve of claim 20 wherein said taper is between about 11° and 12°.

22. The control valve of claim 11 wherein the direction of fluid flow as it enters the chamber is at 90° to the longitudinal axis of the sleeve portion.

23. The control valve of claim 22 wherein the direction of fluid flow at the outlet is along the longitudinal axis of the sleeve portion.

24. The control valve of claim 22 wherein the direction of fluid flow at the outlet is at 90° to the longitudinal axis of the sleeve portion.

25. The control valve of claim 11 wherein the cross sectional areas of the chamber taken perpendicular to the direction of fluid flow within the chamber at locations where one-half of the fluid passes, are about twice the cross sectional areas of the chamber taken perpendicular to the direction of fluid flow within the chamber at locations where one-fourth of the fluid passes.

26. The control valve of claim 25 wherein the cross sectional areas of the chamber taken perpendicular to the direction of fluid flow within the chamber at locations where three-fourths of the fluid passes, are about one and one-half times the cross sectional areas of the chamber taken perpendicular to the direction of fluid flow within the chamber at locations where one-half of the fluid passes.

27. The control valve of claim 11 wherein the longitudinal axis of the sleeve portion is parallel to but offset from the longtitudinal axis of the cylindrical section in a direction directly away from the flow of fluid as it enters the inlet chamber, whereby one-half of the fluid entering the chamber flows in one direction about the sleeve portion, and the other half flows in the opposite direction about the sleeve portion.

28. A control valve comprising:
(a) a valve body;
(b) a first valve member supported by the valve body;
(c) a second valve member supported by the valve body, one of the valve members being adjustably movable relative to the other valve member;
(d) said control valve having a fluid inlet, a fluid outlet, and a fluid passage from the inlet to the outlet for the flow of fluid therethrough.
(e) said valve body having a hollow portion in the fluid passage defining a cylindrical section;
(f) the valve members defining a control orifice means therebetween within said passage for the flow of fluid therethrough, said orifice means being generally annular with the flow of fluid being generally radially through the annular orifice;
(g) an inlet chamber in the passage at the entrance of the orifice means;
(h) the passage and orifice means directing the fluid flow such that the fluid turns 90° as it flows from the chamber into the orifice means and turns 90° as it flows from the orifice means;
(i) the cross section of the chamber taken perpendicular to the longitudinal axis of the cylindrical section of the valve body being generally an eccentric annulus;
(j) one of the valve members being adjustable axially relative to the other valve member to vary the size of the orifice means.

29. The control valve of claim 28 whereas the flow of fluid as it enters the chamber is at 90° to the longitudinal axis of the annular orifice means.

30. The control valve of claim 29 wherein the flow of fluid at the outlet is along the longitudinal axis of the annular orifice means.

31. The control valve of claim 29 wherein the flow of fluid at the inlet and the flow of fluid at the outlet are along parallel paths.

32. The control valve of claim 29 wherein the flow of fluid at the outlet is at 90° to the longitudinal axis of the annular orifice means.

33. The control valve of claim 28 wherein one of said valve members has a concave conical portion located inwardly of the annular orifice means against which the fluid impinges as it passes through the annular orifice means to provide a smooth path for the fluid as it turns 90° from the annular orifice means.

34. The control valve of claim 28 wherein one of the members is movable axially in sliding sealing engagement relative to the valve body.

35. The control valve of claim 28 further comprising a diaphragm for mounting the movable member to the valve body for movement of the movable member along its longitudinal axis.

36. The control valve of claim 28 wherein said movable member further comprises a valve stem movable axially, and wherein said valve further comprises an outlet chamber surrounding the stem at a location spaced axially from the inlet chamber, the direction of fluid flow as the fluid enters the inlet chamber and the direction of fluid flow as the fluid exits the outlet chamber each being at 90° to the longitudinal axis of the valve stem, whereby the fluid at the inlet chamber is directed radially through the annular orifice means, then turns 90° to flow in a direction generally parallel to the longitudinal axis of the valve stem, and then turns 90° within the outlet chamber and is directed toward the outlet.

37. The control valve of claim 36 wherein said stem has a conical section located within the outlet chamber 38. The control valve of claim 37 wherein said conical section located within the outlet chamber is convexly shaped.

39. The control valve of claim 36 further comprising first and second diaphragms near the ends of the valve stem connecting the valve stem to the valve body for movement of the valve stem along its longitudinal axis.

40. The control valve of claim 28 wherein the longitudinal axis of the annular orifice is parallel to but offset from the longtitudinal axis of the cylindrical section in a direction directly away from the flow of fluid as it enters the inlet chamber, whereby one-half of the fluid entering the chamber flows in one direction about the annular orifice, and the other half flows in the opposite direction about the annular orifice.

41. The control valve of claim 36 wherein the longitudinal axis of the valve stem is parallel to but offset from the longtitudinal axis of the cylindrical section in a direction directly away from the flow of fluid as it enters the inlet chamber, whereby one-half of the fluid entering the chamber flows in one direction about the valve stem, and the other half flows in the opposite direction about the valve stem.

* * * * *